US009716342B2

(12) United States Patent
Moseke et al.

(10) Patent No.: US 9,716,342 B2
(45) Date of Patent: Jul. 25, 2017

(54) PLUG-IN CONNECTOR PART COMPRISING A LOCKING ELEMENT (71) Applicant: Phoenix Contact E-Mobility GmbH, Schieder-Schwalenberg (DE)

(72) Inventors: Dirk Moseke, Hoexter-Luechtringen (DE); Frederik Effenberger, Detmold (DE)

(73) Assignee: PHOENIX CONTACT E-MOBILITY GMBH, Schieder-Schwalenberg (DE)

( * ) Notice: Subject to any disclaimer, the term of this patent is extended or adjusted under 35 U.S.C. 154(b) by 0 days.

(21) Appl. No.: 15/245,233

(22) Filed: Aug. 24, 2016

(65) Prior Publication Data
US 2017/0062984 A1 Mar. 2, 2017

(30) Foreign Application Priority Data

Aug. 26, 2015 (DE) ........................ 10 2015 114 138

(51) Int. Cl.
*H01R 13/629* (2006.01)
*H01R 13/639* (2006.01)
*H01R 13/633* (2006.01)
*H01R 13/627* (2006.01)

(52) U.S. Cl.
CPC ....... *H01R 13/639* (2013.01); *H01R 13/6272* (2013.01); *H01R 13/6335* (2013.01)

(58) Field of Classification Search
CPC H01R 13/629; H01R 13/639; H01R 13/6272; H01R 13/62933; H01R 13/6275
USPC ............. 439/352, 34, 348, 310, 372; 70/490
See application file for complete search history.

(56) References Cited

U.S. PATENT DOCUMENTS

| 5,350,312 | A | * | 9/1994 | Kuno | B60L 11/1818 |
| | | | | | 439/310 |
| 5,458,496 | A | * | 10/1995 | Itou | B60L 11/1846 |
| | | | | | 439/34 |
| 6,225,153 | B1 | * | 5/2001 | Neblett | B60L 11/1818 |
| | | | | | 438/188 |
| 6,371,768 | B1 | * | 4/2002 | Neblett | B60L 11/1818 |
| | | | | | 439/34 |

(Continued)

FOREIGN PATENT DOCUMENTS

DE 102013204904 A1 9/2013
EP 0644625 B1 3/1995

*Primary Examiner* — Gary Paumen
(74) *Attorney, Agent, or Firm* — Leydig, Voit & Mayer, Ltd.

(57) ABSTRACT

A plug-in connector part includes a housing and a plug-in portion arranged on the housing and that can be brought into plugged engagement with an associated mating plug-in connector part so as to electrically contact the plug-in connector part and the mating plug-in connector part. A locking element is movably arranged on the housing and can lock the plug-in connector part to the mating plug-in connector part, the locking element being movable between a locked position, in which the plug-in connector part is locked to the mating plug-in connector part, and an unlocked position, in which the plug-in connector part can be removed from the mating plug-in connector part. A blocking element is arranged on the housing and guided on the housing so as to be adjustable in an adjustment direction. The blocking element can block the locking element in the locked position. The blocking element includes a handle element.

11 Claims, 7 Drawing Sheets (56) References Cited

U.S. PATENT DOCUMENTS

| | | | | |
|---|---|---|---|---|
| 7,963,793 | B2* | 6/2011 | Poulin | B60L 11/1818 439/34 |
| 8,016,607 | B2* | 9/2011 | Brown, II | B60L 11/1818 439/34 |
| 8,342,856 | B2* | 1/2013 | Takada | H01R 13/521 439/246 |
| 8,597,046 | B2* | 12/2013 | Osawa | B60L 11/1818 439/469 |
| 8,678,845 | B2* | 3/2014 | Osawa | H01R 13/502 439/352 |
| 9,318,845 | B2* | 4/2016 | Ohmura | H01R 13/6275 |
| 2011/0034053 | A1* | 2/2011 | Matsumoto | B60L 3/0069 439/304 |
| 2011/0212645 | A1* | 9/2011 | Osawa | H01R 13/502 439/352 |
| 2011/0223792 | A1* | 9/2011 | Osawa | B60L 11/1818 439/345 |
| 2011/0318950 | A1* | 12/2011 | Ichio | B60L 11/1818 439/345 |
| 2012/0064755 | A1* | 3/2012 | Ichio | H01R 13/5227 439/358 |
| 2013/0047687 | A1 | 2/2013 | Kurumizawa et al. | |
| 2013/0252448 | A1* | 9/2013 | Schulte | H01R 13/6397 439/304 |
| 2015/0155656 | A1* | 6/2015 | Sugiyama | B60L 11/1818 439/370 |
| 2015/0197157 | A1* | 7/2015 | Nakajima | B60L 11/1818 439/352 |
| 2016/0013587 | A1* | 1/2016 | Shimizu | H01R 13/5227 439/153 |
| 2016/0028184 | A1* | 1/2016 | Ohmura | B60L 11/1818 439/352 |

* cited by examiner

PLUG-IN CONNECTOR PART COMPRISING A LOCKING ELEMENT

CROSS-REFERENCE TO PRIOR APPLICATION

Priority is claimed to German Patent Application No. DE 10 2015 114 138.8, filed on Aug. 26, 2015, the entire disclosure of which is hereby incorporated by reference herein.

FIELD

The invention relates to a plug-in connector part.

BACKGROUND

A plug-in connector part may comprise a housing and a plug-in portion which is arranged on the housing and which can be brought into plugged engagement with an associated mating plug-in connector part so as to electrically contact the plug-in connector part and the mating plug-in connector part. A plug-in connector part of this type may for example be formed as a charging plug, which is connected for example to a charging station via a charging cable and can be plugged into a charging socket on a vehicle, in particular an electric vehicle, so as to charge vehicle batteries during operation of the vehicle.

In charging plugs for electric vehicles, it may be prescribed for the charging plug to be secured against removal in a position in which it is plugged into a charging socket. For this purpose, in the plug-in connector part, a locking element movably arranged on the housing is provided, and serves to lock the plug-in connector part to the mating plug-in connector part. In this context, the locking element can be moved between a locked position, in which it can lock the plug-in connector part to the mating plug-in connector part, and an unlocked position, in which the plug-in connector part can be removed from the mating plug-in connector part.

By means of the locking element, locking is established between the plug-in connector part and the mating plug-in connector part as soon as the plug-in connector part is brought into plugged engagement with the mating plug-in connector part. In this context, it may be provided that, when the plug-in connector part is used as a charging plug, a charging process can only be initiated once locking is established between the plug-in connector part and the mating plug-in connector part, in this case configured as a charging socket, and the plug-in connector part is thus secured to the mating plug-in connector part against (undesired) removal. If the locking is released (as can be detected for example by means of a suitable switch), the charging process is interrupted and a flow of a charging current via the plug-in connector part is suppressed.

Since actuation of the locking element for unlocking can result in interruption to a charging process, the locking element should only be actuated when this is actually indicated. For example, the locking between the plug-in connector part and the mating plug-in connector part should persist until a charging process has (completely) finished, so as only to make it possible to remove the plug-in connector part from the mating plug-in connector part once the charging process has ended. Therefore, so as to prevent undesired unlocking of the locking element, a blocking element, arranged on the housing and adjustable in an adjustment direction, is provided, which serves to block the locking element in its locked position. By means of the blocking element, the locking element is held in the locked position thereof. Only once the blocking element releases the locking element can the locking element be moved out of the locked position thereof so as to unlock the plug-in connector part from the mating plug-in connector part.

EP 0 644 625 B1 discloses a plug-in connector part in the form of a charging plug, in which a sleeve serving for locking is rotatably arranged on a housing. A rod-shaped blocking element serves to block the sleeve in a locking position and can be adjusted by way of a lock cylinder.

In a plug-in connector part known from US 2013/0047687 A1, a blocking element in the form of a lock actuable by a key is provided on a mating plug-in connector part associated with the plug-in connector part, said lock being formed to block the locking element when the plug-in connector part is plugged into the associated mating plug-in connector part. The locking between the plug-in connector part and the mating plug-in connector part is thus blocked by the lock on the mating plug-in connector part.

In a plug-in connector part known from US 2011/0034053 A1, in the form of a charging plug, a lock is provided on a housing of the plug-in connector part, is actuable between a blocking position and a release position, and blocks a locking element of the plug-in connector part in the blocking position.

In a plug-in connector part known from DE 10 2013 204 904 A1, in the form of a charging plug, a blocking element in the form of a lock is provided on a housing of the plug-in connector part, which lock can act on a locking element by means of a locking latch so as to block said element in a locking position.

SUMMARY

A plug-in connector part includes a housing and a plug-in portion arranged on the housing and that can be brought into plugged engagement with an associated mating plug-in connector part so as to electrically contact the plug-in connector part and the mating plug-in connector part. A locking element is movably arranged on the housing and can lock the plug-in connector part to the mating plug-in connector part, the locking element being movable between a locked position, in which the plug-in connector part is locked to the mating plug-in connector part, and an unlocked position, in which the plug-in connector part can be removed from the mating plug-in connector part. A blocking element is arranged on the housing and guided on the housing so as to be adjustable in an adjustment direction. The blocking element can block the locking element in the locked position. The blocking element includes a handle element. The blocking element, in a release position, allows movement of the locking element between the locked position and the unlocked position. The blocking element is manually movable by a user acting on the handle element in the adjustment direction from the release position into a blocking position, in which the blocking element is operatively connected to the locking element so as to block the locking element in the locked position.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the blocking element comprises a handle element. In this context, the blocking element is formed so as, in a release position, to allow movement of the locking element between the locked position and the unlocked position, and can be manually moved, by a user acting on the handle element, in the adjustment direction from the release position into a blocking position, in which the blocking element is operatively connected to the locking element so as to block the locking element in the locked position.

The blocking element is thus manually actuable by a user. For this purpose, the user can grip the handle element of the blocking element and thus adjust it in the adjustment direction so as to move the blocking element from the release position thereof into the blocking position and thus to block the locking element against (undesired) actuation. Conversely, the user can adjust the blocking element counter to the adjustment direction by acting on the handle element, so as to move the blocking element back into the release position and thus to unblock the locking element, in such a way that the locking element can be moved out of the locked position and the connection between the plug-in connector part and the mating plug-in connector part can thus be unlocked.

The blocking element may in particular be formed as an elongate blocking rod that is longitudinally displaceably adjustable with respect to the housing. The blocking element is preferably arranged in a handle of the housing, which a user can grip so as to handle the plug-in connector part, and guided in the adjustment direction so as to be longitudinally displaceable in the handle.

By way of the handle element thereof, the blocking element is thus accessible to a user from outside the housing. Other parts of the blocking element can be at least largely incorporated into the housing.

The blocking element comprises, in a specific embodiment, a blocking portion which is in contact with a projection element of the locking element when in the blocking position. In this context, the contact results in movement of the locking element out of the locked position towards the unlocked position being blocked. As a result of contact between the blocking portion of the blocking element and the projection element of the locking element, the locking element is thus blocked in the locked position thereof, and cannot be moved out of the locked position, at least not without adjusting the blocking element.

By contrast in one embodiment, the blocking portion of the blocking element is positioned, in the release position opposite a release portion of the locking element, which release portion is offset back from the projection element. In this context, the blocking portion thus leaves space relative to the release portion in such a way that the locking element can be moved out of the locked position thereof towards the unlocked position. As a result of the blocking portion of the blocking element being positioned opposite the release portion of the locking element, movement of the locking element is thus possible without obstruction by the blocking element, and so the locking element can be unlocked.

The projection element projects from the release portion, for example in an actuation direction in which the locking element is to be moved so as to be moved from the locked position into the unlocked position. By adjusting the blocking element in the adjustment direction (which can be directed at least approximately transversely to the actuation direction), the blocking portion of the blocking element can be brought into or out of contact with the projection element of the locking element, so as to lock or unlock the locking element. When the blocking portion is in contact with the projection element, movement of the locking element out of the locked position is blocked. By contrast, when the blocking portion is positioned opposite the release portion of the drive element, the locking element can be moved out of the locked position.

The blocking element is preferably resiliently biased towards the release position with respect to the housing. The blocking element is thus adjusted out of the release position counter to the action of a biasing spring element. By contrast, the return of the blocking element towards the release position is resiliently assisted, and can take place (at least largely) automatically.

A spring element for biasing the blocking element with respect to the housing may for example be arranged in a receiving opening in a body of the blocking element. The spring element is thus supported with respect to the blocking element in the receiving opening at one end, and can be supported against the housing at the other end by means of a suitable stop element. When the blocking element is moved out of the release position, the spring element is for example loaded in compression. By contrast, upon movement back into the release position, the spring element is relaxed again.

By gripping the handle element, a user can for example pull on the blocking element and thus move it out of the housing at least in portions. For this purpose, the handle element may for example be arranged on an end of the blocking element that is remote from the blocking portion of the blocking element in the adjustment direction. If a user for example holds the handle element using his fingers, the user can for example pull on the handle element and thus move the blocking element in the adjustment direction, out of the release position thereof towards the blocking position.

Conversely, by pressing on the handle element counter to the adjustment direction, a user can move the blocking element back into the release position when the locking element is to be unlocked.

By way of the blocking element, it is possible to block the locking element in such a way that the locking element can only be unblocked by an authorized user. For this purpose, an opening, through which for example a shackle of a (U-)lock can be passed, may be arranged in the region of the handle element, for example in an end of the blocking element associated with the handle element. By attaching a lock of this type (also referred to as a padlock), the blocking element can thus be blocked in the blocking position thereof in such a way that the blocking element can only be unblocked and moved back into the release position by an authorized user, who has a matching key for the lock, removing the lock.

The opening in the blocking element for attaching the lock may be concealed or at least partially covered by the housing in the release position, such that a lock cannot be attached to the blocking element in the release position. The opening is only made accessible, in such a way that the lock can be attached to the blocking element, by moving the blocking element out of the housing in the adjustment direction.

It should be noted that in principle other solutions for blocking the blocking element in the blocking position thereof are also conceivable and possible. Thus, for example, a lock that is actuable using a key, may be arranged on the housing or on the blocking element in an integrated manner such that a separate lock in the form of a padlock is not required.

In one embodiment, an locking element is fixedly arranged on the housing, and serves to (positively) lock the blocking element in the blocking position. This may be advantageous in particular if the blocking element is resiliently biased towards the release position thereof and the blocking element is thus moved into the blocking position counter to the biasing action of a resilient spring element. In this case, latching for the blocking element in the blocking position can be provided by way of the locking element, in such a way that the blocking element is held in the blocking position by latching.

For this purpose, the locking element may for example be configured in the manner of a latching tab, which, in the blocking position, is engaged with a latching portion of the blocking element. The resulting latching is releasable, for example in that a user presses on the handle element of the blocking element counter to the adjustment direction, causing the locking element to be moved out of engagement with the latching portion of the blocking element. After the latching is undone, the blocking element is subsequently moved back into the release position in a spring-assisted manner under the biasing action of the resilient spring element.

The locking element serves primarily to latch the blocking element to the housing when the blocking element has reached the blocking position thereof. In this context, however, the locking element may also take on other functions in a synergistic twofold usage. Thus, the locking element may for example have an opening through which an electric cable connected to the housing extends. In this way, the locking element may for example also serve as tension relief and/or as a guide element for the cable in the housing.

In one embodiment, the locking element is arranged on the housing so as to be pivotable about a pivot shaft. By contrast, the blocking element is displaceable in the adjustment direction on or in the housing. In the blocking position of the blocking element, pivoting of the locking element out of the locked position is blocked; by contrast, in the release position, the locking element can be pivoted on the housing in a manner unobstructed by the blocking element and can thus be moved between the locked position and the unlocked position.

In this connection, however, it is also conceivable and possible to displaceably arrange the locking element for example on the housing.

Figure 1:
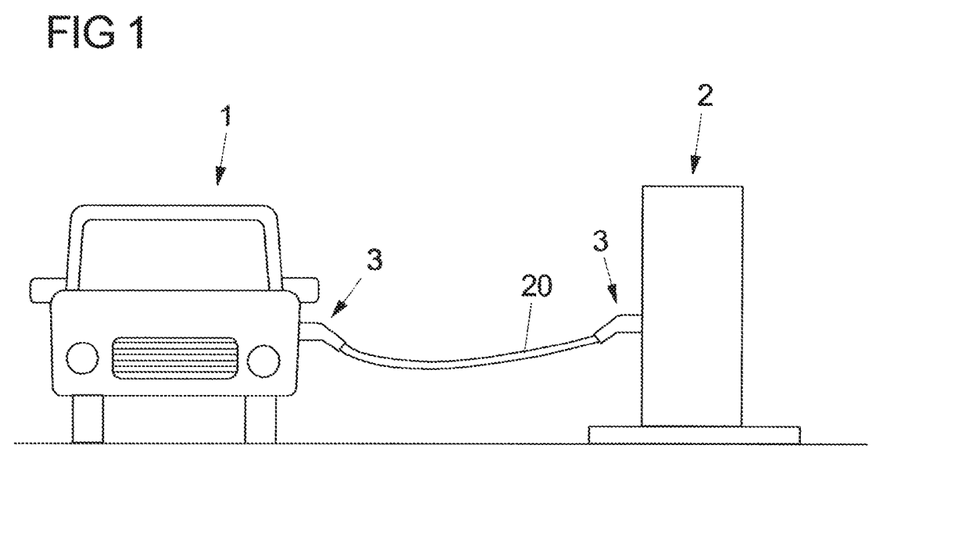
FIG. 1 is a schematic view of an electric vehicle at a charging station.

FIG. 1 is a schematic view of a vehicle in the form of an electric vehicle 1, which is connected to a charging station 2 via a charging cable 20 so as to charge batteries for the electrical operation of the vehicle 1. A plug-in connector part 3 in the form of a charging plug is arranged on the charging cable 20 at an end of the charging cable 20 associated with the vehicle 1, and can be brought into plugged engagement with an associated mating plug-in connector part in the form of a charging socket on the vehicle 1 so as to establish electrical contact between the charging cable 20 and the vehicle 1 and to transfer charging currents from the charging station 2 to the vehicle 1.

The charging cable 20 may also be connected to the charging station 2 via a (further) plug-in connector part 3 on the end of the charging cable 20 associated with the charging station 2, which plug-in connector part can be brought into plugged engagement with an associated mating plug-in connector part belonging to the charging station 2.

Figure 2:
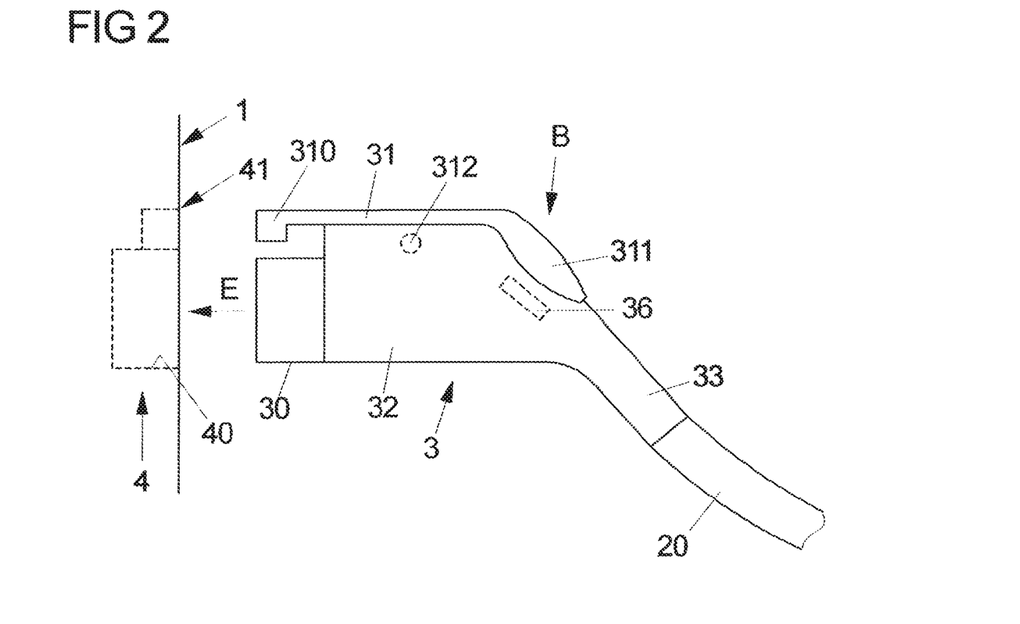
FIG. 2 is a schematic view of a plug-in connector part in the form of a charging plug.
Figures 3A, 3B:
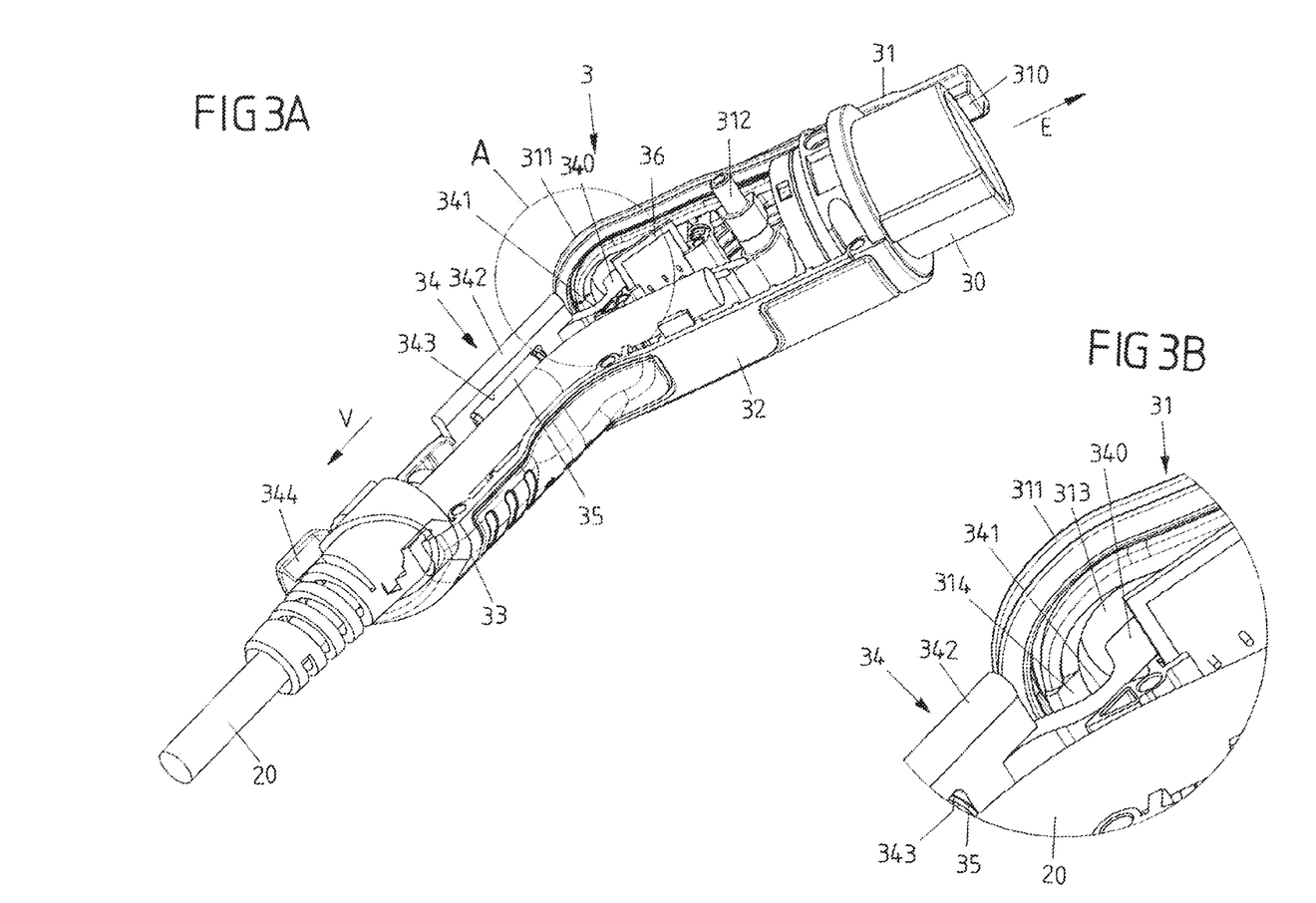
FIG. 3A is a perspective, partially cutaway view of a specific embodiment of a plug-in connector part, having a blocking element in a release position.
FIG. 3B is an enlarged view of the detail A of FIG. 3A.

FIG. 2 is a schematic view of the plug-in connector part 3. The plug-in connector part 3 comprises a housing 32 and a plug-in portion 30 arranged thereon which can be plugged into a plug-in opening 40 in a mating plug-in connector part 4 in a plug-in direction E. Electrical contacts, via which electrical contact of the plug-in connector part 3 and the mating plug-in connector part 4 can be established, may be provided on the plug-in portion 30 of the plug-in connector part 3 as well as in the plug-in opening 40 in the mating plug-in connector part 4.

A handle 33, by way of which a user can grip the plug-in connector part 3 so as to place it on the mating plug-in connector part 4, is formed on the housing 32 remote from the plug-in portion 30. The charging cable 20 leads into the handle 33, and is electrically connected to the plug-in connector part 3 and the electric contacts thereof inside the housing 32.

The plug-in connector part 3 comprises a locking element 31, which is arranged on the housing 32 so as to be pivotable about a pivot shaft 312. The locking element 31 comprises, on an end facing the plug-in portion 30, a locking tab 310, which can be brought into locked engagement with an associated locking element 41 of the mating plug-in connector part 4 when the plug-in connector part 3 is plugged into the mating plug-in connector part 4 in the plug-in direction E. In this context, the locking element 31 is preferably resiliently biased into a locked position in such a way that, when the plug-in connector part 3 is plugged into the mating plug-in connector part 4, mechanical locking between the locking element 31 and the locking element 41 is established automatically.

When the plug-in connector part 3 is plugged in, the locking element 31 serves to mechanically secure the connection between the plug-in connector part 3 and the mating plug-in connector part 4, such that the plug-in connector part 3 cannot easily be removed from the mating plug-in connector part 4. It is (only) possible to remove the plug-in connector part 3 from the mating plug-in connector part 4 if the locking element 31 is actuated for unlocking and pivoted out of the locked position thereof for this purpose by manually pressing, in an actuation direction B, on an actuation portion 311 on an end of the locking element 31 that is remote from the locking tab 310, so as to bring the locking tab 310 out of engagement with the locking element 41 belonging to the mating plug-in connector part 4.

In the plug-in connector part 3, it may be provided that a charging process, in other words a transfer of charging currents, only takes place when the locking element 31 is in the locked position thereof and the plug-in connector part 3 is thus connected and mechanically locked to the mating plug-in connector part 4. If the locking elements 31 is actuated for unlocking, this may be detected by way of a suitable switching element 36, for example a mechanical button or switch. If it is detected that the locking element 31 has been actuated for unlocking, a charging process is interrupted and is only continued once the locking element 31 has been brought back into the locked position.

In the plug-in connector part 3 shown in a specific embodiment in FIGS. 3A and 3B to 8, so as to prevent undesired interruption as a result of (accidental) actuation of the locking element 31, a blocking element 34 is provided in the form of a blocking rod, which is longitudinally displaceably guided inside the handle 33 of the housing 32 and which can be brought into blocked engagement with the locking element 31 so as to hold the locking element 31 in the locked position thereof.

Figure 4:
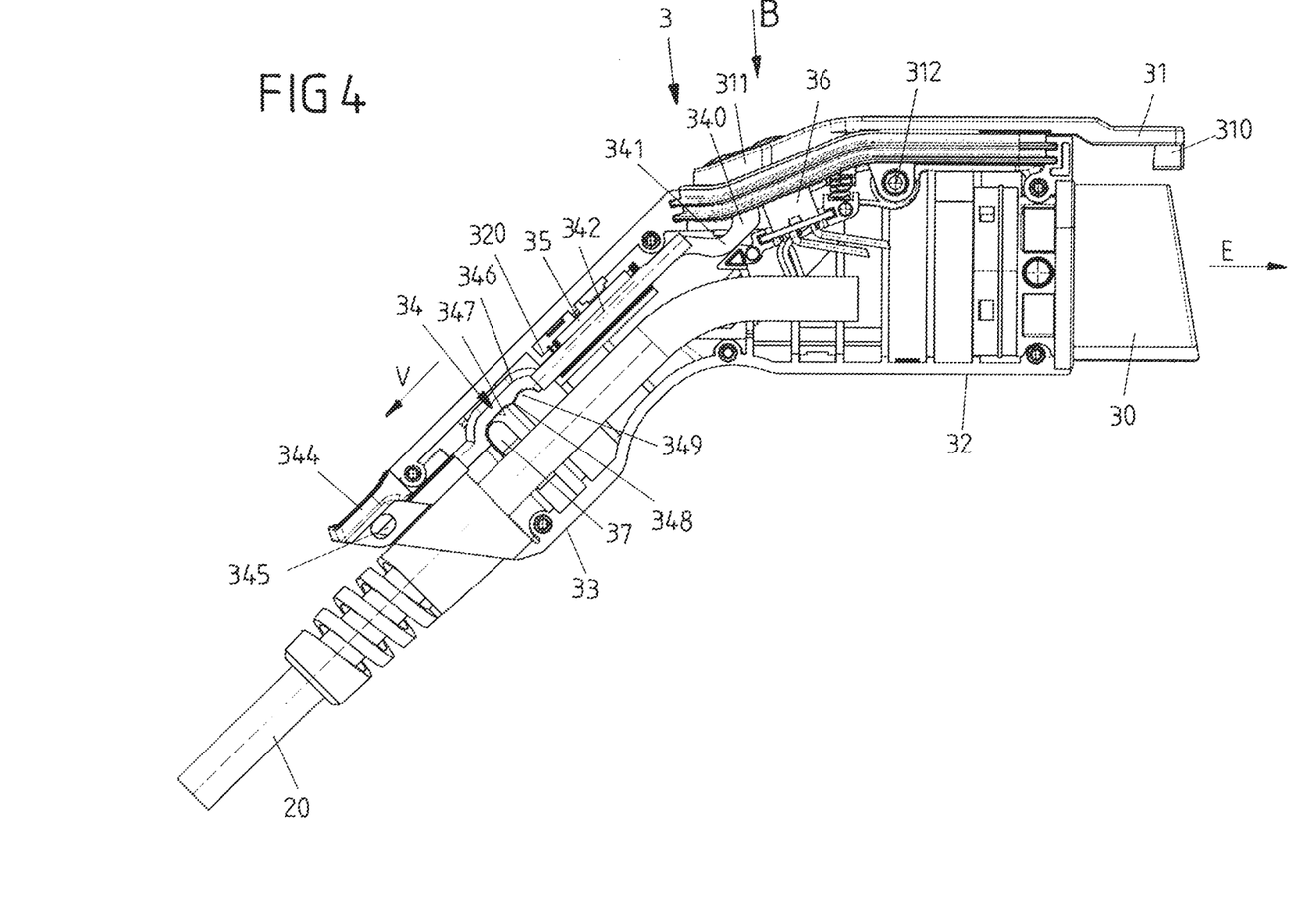
FIG. 4 is a side view of the plug-in connector part of FIG. 3A.

The blocking element 34 comprises, at an end that is remote from the locking element 31, a handle element 344 which is manually actuable by a user. In this context, the blocking element 34 is largely incorporated into the handle 33 of the plug-in connector part 3, and longitudinally displaceably guided in the adjustment direction V in said handle 33, whilst still being accessible from the outside by way of the handle element 344 (see for example FIG. 4).

FIGS. 3A and 3B to 5 show the plug-in connector part 3 having the blocking element 34 in a release position. In this release position, the locking element 31 can be pivoted about its pivot shaft 312 in an unobstructed manner, and thus moved between the locked position thereof and an unlocked position. In particular, in the release position of the blocking element 34, it is possible to unlock the locking element 31 so as to release a connection of the plug-in connector part 3 to the associated mating plug-in connector part 4.

The blocking element 34 comprises, at an end that is remote from the handle element 344, a blocking portion 340 in the form of a tab, which is connected to a body 42 of the blocking element 34 via a shackle portion 341. In the release position, this blocking portion 340 of the blocking element 34 lies in a space formed inside the locking element 31 (see in particular FIG. 3B and FIG. 5), and is located opposite a release portion 313 of the locking element 31 (see FIG. 5).

Figure 5:
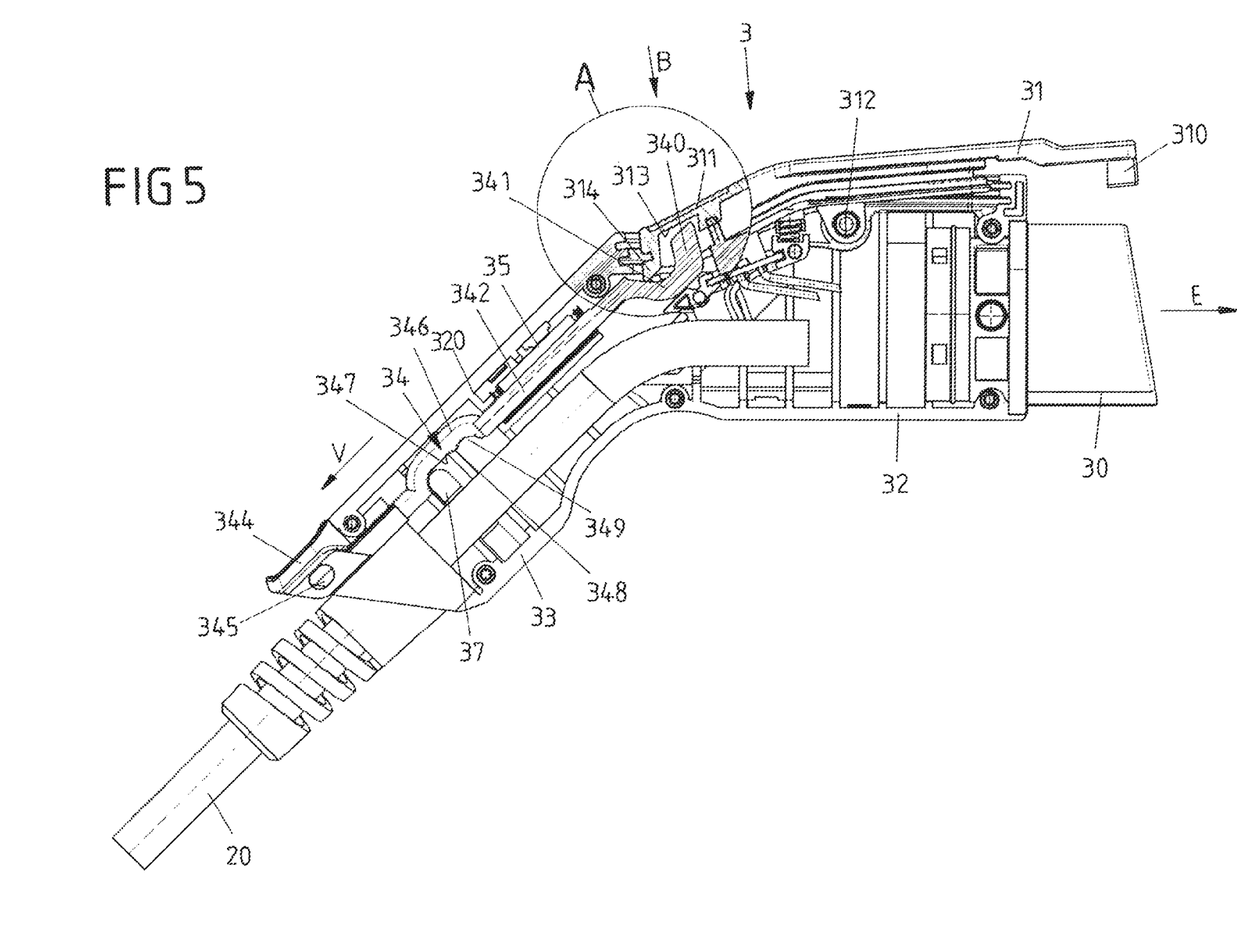
FIG. 5 is the view of FIG. 4, in section in the detail A.
Figures 6A, 6B:
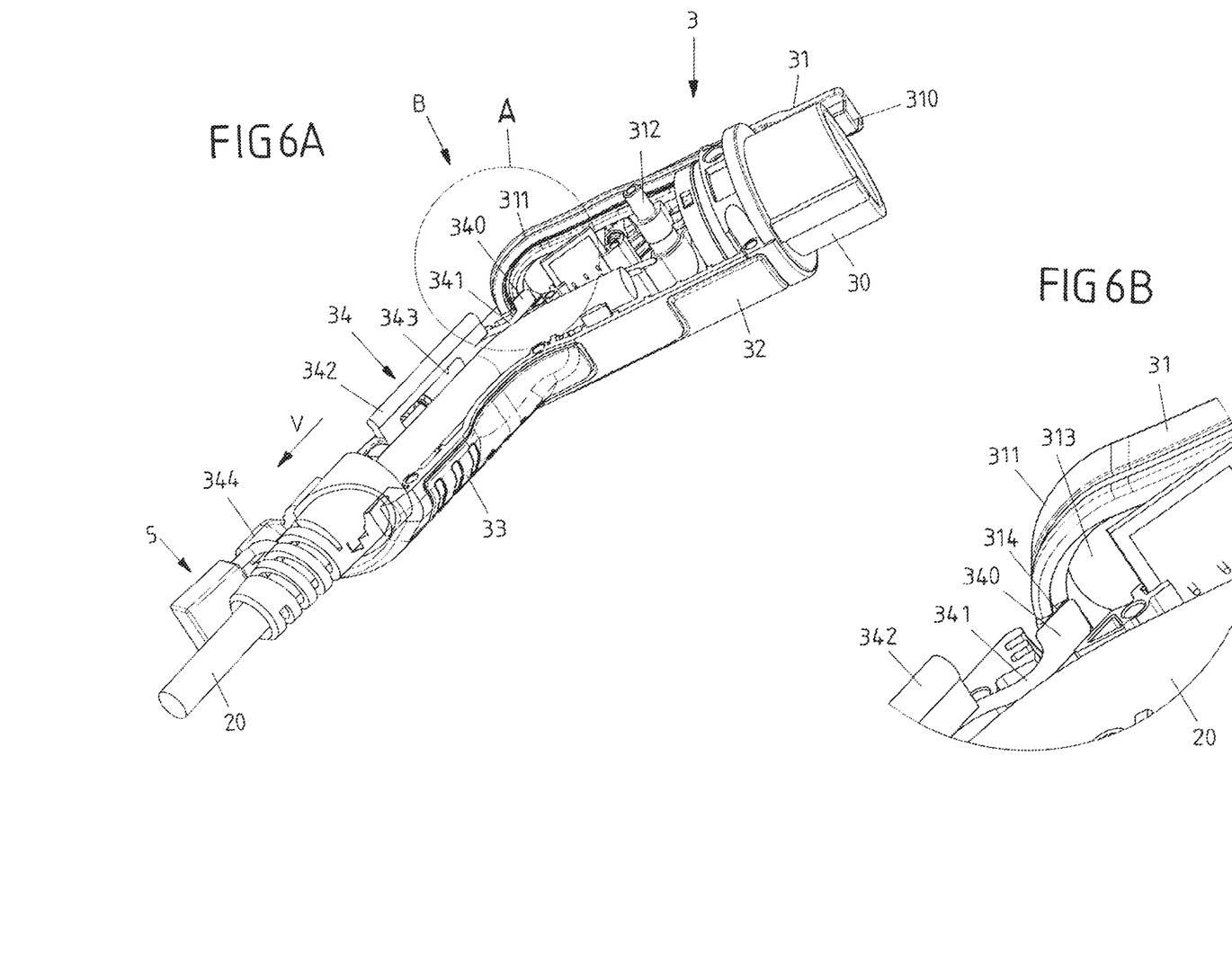
FIG. 6A is a view of the plug-in connector part, having the blocking element in a blocking position.
FIG. 6B is an enlarged view of the detail A of FIG. 6A.
Figure 7:
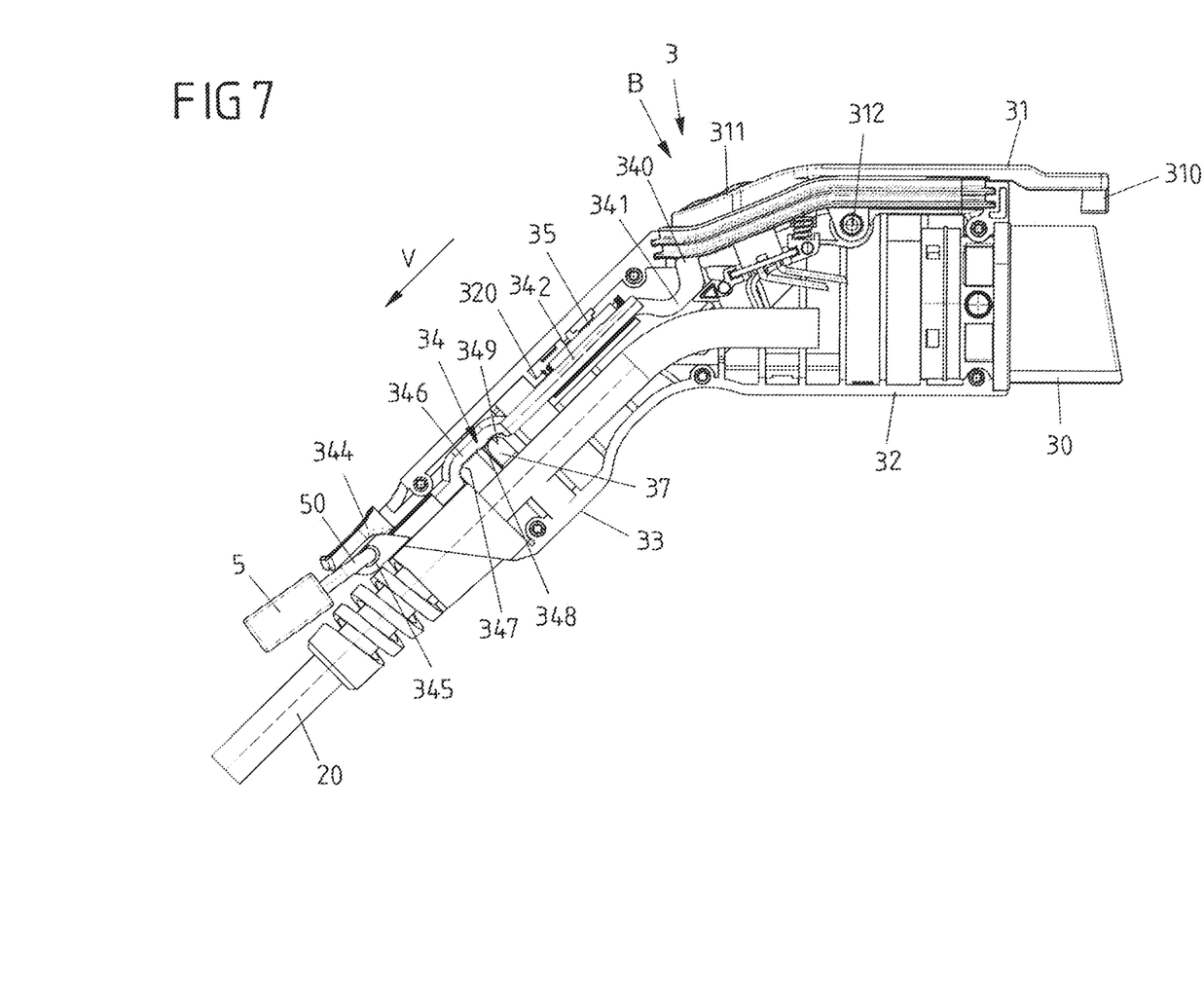
FIG. 7 is a side view of the arrangement of FIG. 6A.
Figure 8:
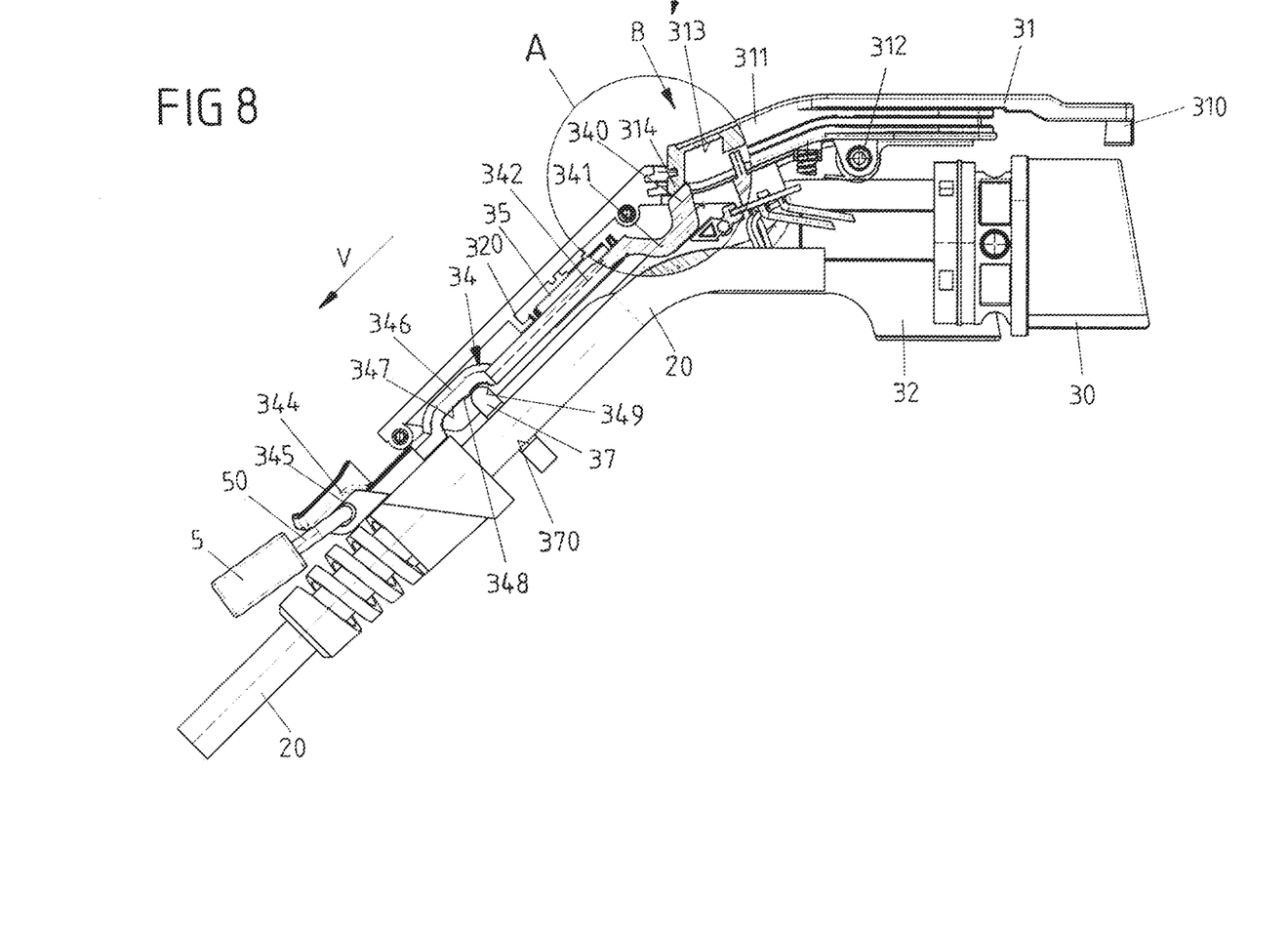
FIG. 8 is the view of FIG. 7, in section in the detail A.

In the release position, the blocking portion 43 is spaced apart from the release portion 313 in such a way that the actuation portion 311 of the locking element 31 moves in the actuation direction B relative to the blocking portion 340 of the blocking element 34, and can thus be pivoted about the pivot shaft 312 thereof for unlocking. In the release position, the blocking element 34 thus does not prevent movement of the locking element 31. In this context, the (curved) shackle portion 341 of the blocking element 34 encloses a projection element 314 of the locking element 31, which projection element is formed on an inner edge portion of the locking element 31 and projecting with respect to the release portion 313.

An opening 343 (see for example FIG. 3A), in which a spring element 35 in the form of a compression spring is arranged, is made in the body 342 of the blocking element 34. One end of the spring element 35 is support against the body 342 of the blocking element 34, and the other, opposite end thereof is engaged with a stop element 320 (see for example FIG. 4) of the housing 32 in such a way that the spring element 35 is braced against the housing 32 by means of said stop element.

If the blocking element 34 is adjusted out of the release position thereof in the adjustment direction V, this takes place counter to the biasing action of the spring element 35, which is loaded in compression when the blocking element 34 is adjusted in the adjustment direction V.

Adjusting the blocking element 34 in the adjustment direction V causes the blocking portion 340 to be brought into contact with the projection element 314 of the locking element 31, which projection element projects with respect to the release portion 313, as is shown in FIGS. 6A and 6B to 8. During adjustment out of the release position, the blocking portion 340 of the blocking element 34 runs onto this projection element 315 and thus presses the locking element 31 counter to the actuation direction B towards the locked position (see in particular FIG. 8).

When the blocking element 34 is in the blocking position shown in FIGS. 6A and 6B to 8, the blocking portion 340 is in contact with the projection element 314 of the locking element 31 and thus blocks the locking element 31 in the locked position thereof. The locking element 31 is thus blocked and cannot be moved out of the locked position thereof, at least not without unblocking the blocking element 34.

An opening 345 is arranged on the underneath of the handle element 344 of the blocking element 34, through which opening a shackle 50 of a lock 5 can be passed. By way of the lock 5, the blocking element 5 can be held in the blocking position thereof in such a way that it is only possible for the blocking element 34 to return from the blocking position into the release position after the lock 5 has been released. The lock 5 may for example only be actuable by an authorized user using a matching key, so that it is only possible for the blocking element 34 to be unblocked by an authorized user who has the key.

The opening 345 in the blocking element 34 is only released in the blocking position of the blocking element 34 such that the shackle 50 of the lock 5 can be passed through the opening. By contrast, in the release position, and also before the blocking position is reached, the opening 345 is covered at least in part by a housing portion of the housing 32, and thus cannot be passed through by the shackle 50.

On the housing 32, specifically inside the handle 33, an locking element 34 is arranged, which serves to (releasably) latch the blocking element 34 to the housing 32 in the blocking position, so as to prevent automatic return under the biasing action of the spring element 35. In the blocking position of the blocking element 34, this locking element 37 engages in a latching portion 349 on a shackle arm 346 of the blocking element 34 and thus holds the blocking element 34 latched in position when the blocking element 34 has reached the blocking position thereof.

The shackle arm 346 extends on a side of the body 342 remote from the blocking portion 340. On an inner face facing the locking element 37, this shackle arm 346 forms a sliding portion 347 and the latching portion 349, which are separated from one another by a latching tab 348.

In the release position (see in particular FIG. 5), the locking element 37 is located in the region of the sliding portion 347. Adjusting the blocking element 34 in the adjustment direction V causes the locking element 37 to slide on the sliding portion 347 and not to obstruct a movement of the blocking element 34.

When the blocking element 34 reaches the blocking position thereof (see in particular FIG. 8), the latching tab 348 of the blocking element 34 is moved past the locking element 37 in such a way that the locking element 37 comes into engagement with the latching portion 349. The blocking element 34 is thus latched to the locking element 37 and is thus held in the blocking position.

To return the blocking element 34, a user can, after releasing the lock 5, press on the handle element 144 counter to the adjustment direction V, causing the latching tab 348 of the blocking element 34 to overcome the locking element and then to be automatically returned into the release position in a spring-assisted manner under the biasing action of the spring element 35.

The locking element 37 is arranged inside the handle 33 of the housing 32 as a stationary element. In this context, the locking element 37 has an opening 370, through which the cable 20 extends. In this way, the locking element 37 may also serve to fix and/or guide the cable 20 inside the housing 32. In particular, the locking element 37 may provide tension relief for the cable 20.

The concept of the invention is not limited to the embodiments described above, but can also in principle be implemented in embodiments of completely different natures.

In particular, a plug-in connector part of the type described herein can be used not only as a charging plug on a charging system for charging an electric vehicle. In principle, a plug-in connector part of the type described herein can also be used for completely different applications.

The locking element may be displaceable or pivotable.

The blocking element may be configured in a completely different manner, and is thus not limited to the embodiment disclosed herein.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Vehicle
2 Charging station
20 Charging cable
3 Plug-in connector part (charging plug)
30 Plug-in portion
31 Locking element
310 Locking tab
311 Actuation portion
312 Pivot shaft
313 Release portion
314 Projection element
32 Housing
320 Stop element
33 Handle
330 Pin
331 Opening
34 Blocking element (blocking rod)
340 Blocking portion
341 Shackle portion
342 Body
343 Receiving opening
344 Handle element
345 Opening
346 Shackle arm
347 Sliding portion
348 Latching tab
349 Latching portion
35 Spring element
36 Switching element
37 Locking element
370 Opening
4 Mating plug-in connector part
40 Plug-in opening
41 Locking element
5 Lock
50 Shackle
B Actuation direction
E Plug-in direction
V Adjustment direction

What is claimed is:

1. A plug-in connector part, comprising:
a housing;
a plug-in portion arranged on the housing and configured to be brought into plugged engagement with an associated mating plug-in connector part so as to electrically contact the plug-in connector part and the mating plug-in connector part;
a locking element movably arranged on the housing and configured to lock the plug-in connector part to the mating plug-in connector part, the locking element being movable between a locked position, in which the plug-in connector part is locked to the mating plug-in connector part, and an unlocked position, in which the plug-in connector part is configured to be removed from the mating plug-in connector part; and
a blocking element, arranged on the housing and guided on the housing so as to be adjustable in an adjustment direction, the blocking element being configured to block the locking element in the locked position,
wherein the blocking element comprises a handle element, the blocking element being configured, in a release position, to allow movement of the locking element between the locked position and the unlocked position, and being configured to be manually movable by a user acting on the handle element, in the adjustment direction from the release position into a blocking position, in which the blocking element is operatively connected to the locking element so as to block the locking element in the locked position.

2. The plug-in connector part according to claim 1, wherein the blocking element comprises a blocking portion which is in contact with a projection element of the locking element when in the blocking position such that movement of the locking element out of the locked position towards the unlocked position is blocked.

3. The plug-in connector part according to claim 2, wherein, in the release position, the blocking portion is positioned opposite a release portion of the locking element, which release portion is offset back from the projection element such that the locking element is configured to be moved between the locked position and the unlocked position.

4. The plug-in connector part according to claim 1, wherein the blocking element is resiliently biased towards the release position with respect to the housing.

5. The plug-in connector part according to claim 1, wherein the blocking element comprises a body having a receiving opening therein, in which opening a spring element configured to resiliently bias the blocking element with respect to the housing is arranged.

6. The plug-in connector part according to claim 1, wherein the blocking element is configured be moved out of the housing at least in part by the handle element.

7. The plug-in connector part according to claim 1, wherein the blocking element comprises, in the region of the handle element, an opening configured to releasably attach a lock.

8. The plug-in connector part according to claim 1, further comprising a locking element fixedly arranged on the housing, the locking element being configured to lock the blocking element in the blocking position.

9. The plug-in connector part according to claim 8, wherein, in the blocking position, the locking element is engaged with a latching portion of the blocking element.

10. The plug-in connector part according to claim 8, wherein the fixed locking element has an opening through which an electric cable connected to the housing extends.

11. The plug-in connector part according to claim 1, wherein the locking element is arranged on the housing so as to be pivotable about a pivot shaft.

* * * * *